United States Patent
Uemura et al.

(10) Patent No.: US 6,242,835 B1
(45) Date of Patent: Jun. 5, 2001

(54) CORE SHEET, CORE AND METHOD OF MANUFACTURING AN ARMATURE

(75) Inventors: Keiichi Uemura, Kariya; Toshio Yamamoto, Kosai, both of (JP)

(73) Assignee: ASMO Co., Ltd., Shizuoka (JP)

( * ) Notice: Subject to any disclaimer, the term of this patent is extended or adjusted under 35 U.S.C. 154(b) by 0 days.

(21) Appl. No.: 09/258,161

(22) Filed: Feb. 25, 1999

(30) Foreign Application Priority Data

Mar. 6, 1998 (JP) .................................................. 10-055154

(51) Int. Cl.[7] ........................................................ H02K 3/48
(52) U.S. Cl. ............................................. 310/214; 310/216
(58) Field of Search ............................ 310/51, 193, 214, 310/216, 264

(56) References Cited

U.S. PATENT DOCUMENTS

| | | | |
|---|---|---|---|
| 911,713 | * 2/1909 | Frankenfield | 310/214 |
| 1,034,069 | * 7/1912 | Brown | 310/214 |
| 2,648,788 | * 8/1953 | Fleischer | 310/51 |
| 4,616,151 | * 10/1986 | Pryjmak | 310/216 |
| 4,700,098 | * 10/1987 | Kawashima | 310/186 |
| 4,829,206 | * 5/1989 | Honshima et al. | 310/214 |
| 4,847,526 | * 7/1989 | Takehara et al. | 310/185 |
| 4,876,473 | * 10/1989 | Tanaka et al. | 310/216 |
| 4,896,066 | * 1/1990 | Tomite | 310/214 |
| 5,705,874 | * 1/1998 | Grudl | 310/216 |
| 5,801,436 | * 9/1998 | Suzuki et al. | 310/51 |
| 5,986,377 | * 11/1999 | Yamada et al. | 310/216 |

FOREIGN PATENT DOCUMENTS

| | | |
|---|---|---|
| 4-26344 | * 1/1992 | (JP) . |
| 9-215280 | 8/1997 | (JP) . |

* cited by examiner

*Primary Examiner*—I. E. Tamai
(74) *Attorney, Agent, or Firm*—Fish & Richardson PC (57) ABSTRACT

An armature for a motor has a core, which comprises a plurality of core sheets stacked together in an axial direction. Each sheet has a plurality of teeth having an extended protrusion which covers an armature winding fitted in slots. The extended protrusion may be a pair of bendable long protrusion pieces on each tooth of one sheet, and a pair of bendable short protrusion pieces on each tooth of another sheet stacked adjacently to the one sheet. Alternatively, the extended protrusion may be a pair of long protrusion piece and short protrusion piece on each tooth. The protrusion pieces are bent to cover the armature winding after winding operation, leaving only a narrow slit between the two extended protrusions. The slit is discontinuous in an axial direction of the core. Thus, the armature winding is restricted from slipping out from the slots, and cogging in torque of the motor is reduced.

9 Claims, 8 Drawing Sheets

CORE SHEET, CORE AND METHOD OF MANUFACTURING AN ARMATURE

CROSS REFERENCE TO RELATED APPLICATION

This application relates to and incorporates herein by reference Japanese Patent Application No. 10-55154 filed on Mar. 6, 1998.

BACKGROUND OF THE INVENTION

1. Field of the Invention

The present invention relates to a core sheet, core and method of manufacturing an armature using the core sheet.

2. Related Art

Figure 19:
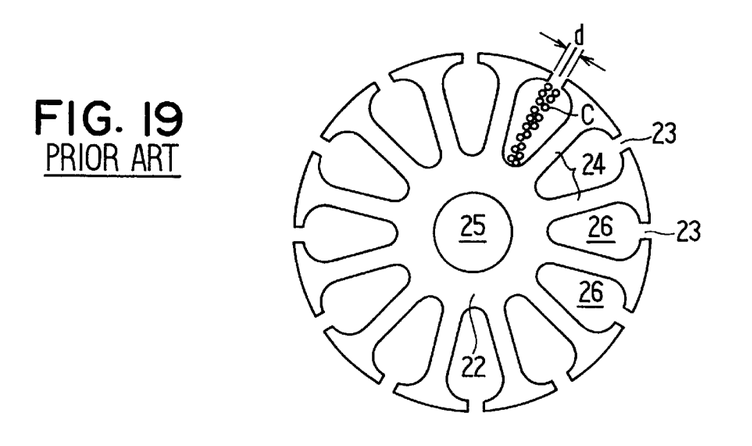
FIG. 19 is a side view of a conventional core sheet used in the core shown in shown in FIG. 18.

In a conventional electric motor, as shown in FIGS. 19, 20, 21, an armature 20 has a rotary shaft SH at its radial center. A core 21 wound with armature windings C is fixed to the rotary shaft SH together with commutator SG. The core 21 comprises a plurality of stacked core sheets 22, each of which is a thin magnetic steel plate. The core 21 has on its outer peripheral surface a plurality of slits 23, each of which extends in parallel with the rotary shaft SH. The slit 23 has a slit width d in the circumferential direction of the core 21.

The core sheet 22 has a plurality of T-shaped teeth 24 extending in the radial direction from its radial central part. The core sheet 22 also has a through hole 25 at its central part so that the rotary shaft SH passes therethrough in the axial direction. The teeth 24 are spaced apart in the circumferential direction to provide a plurality of slots 26.

Each armature winding C is wound around each tooth 24 through slits 23. Specifically, the armature winding C is wound in the slots 26 from the radial central part toward the outer peripheral part of the core 21 in generally the fixed width d.

In this armature 20, there remains in each slot 26 space at a location other than the space corresponding to the slit width d, because the space for disposing the armature winding C is limited by the slit width d. Thus, the space in the slot 26 is not used effectively.

It is possible to wind the armature winding in more turns in the slot 26 by widening the slit width. However, the widened slit is likely to cause cogging in the torque of the motor, because each slit 23 extends in the axial direction as a continuous line thereby causing reluctance changes at the same time. Further, the slipping out of the armature winding c is likely to occur in the radially outward direction from the slot 26 through the slit. Thus, the width of the slot should not be widened too much.

SUMMARY OF THE INVENTION

It is therefore an object of the present invention to provide an improved core sheet and a core for an armature of an electric motor.

It is another object of the present invention to provide an armature of an electric motor, which has a high space factor in each slot, less cogging in the torque and less slipping out of the armature windings.

It is a further object of the present invention to provide an improved method of manufacturing an armature of an electric motor, which increases efficiency of winding operation.

According to the present invention, an armature for a motor has a core, which comprises a plurality of core sheets stacked together in an axial direction. Each sheet has a plurality of teeth having an extended protrusion, which covers an armature winding fitted in slots. The extended protrusion is a pair of bendable long protrusion pieces on each tooth of one sheet, and a pair of bendable short protrusion pieces on each tooth of another sheet stacked adjacently to the one sheet. Alternatively, the extended protrusion is a pair of long protrusion piece and short protrusion piece on each tooth. The protrusion pieces are bent to cover the armature winding after winding operation, leaving only a narrow slit between the two extended protrusions. Thus, the slit is provided discontinuously in an axial direction of the core, so that cogging in torque of the motor is reduced.

BRIEF DESCRIPTION OF THE PREFERRED EMBODIMENT

Other objects, features and advantages of the present invention will become more apparent from the following detailed description made with reference to the accompanying drawings. In the drawings.

DETAILED DESCRIPTION OF THE PREFERRED EMBODIMENT

The present invention will be described in more detail with reference to various embodiments in which the same parts are designated by the same reference numerals.

(First Embodiment)

Figure 1:
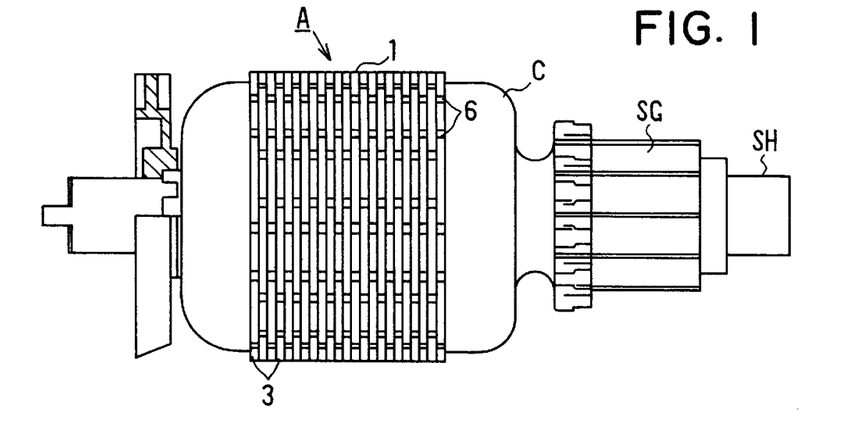
FIG. 1 is a side view of an armature according to a first embodiment of the present invention.

Referring first to FIG. 1, an armature A for an electric motor has a rotary shaft SH at its radial center. A core 1 wound with armature windings C is fixed to the rotary shaft SH together with commutator SG, to which ends of the armature windings C are electrically connected.

Figure 2:
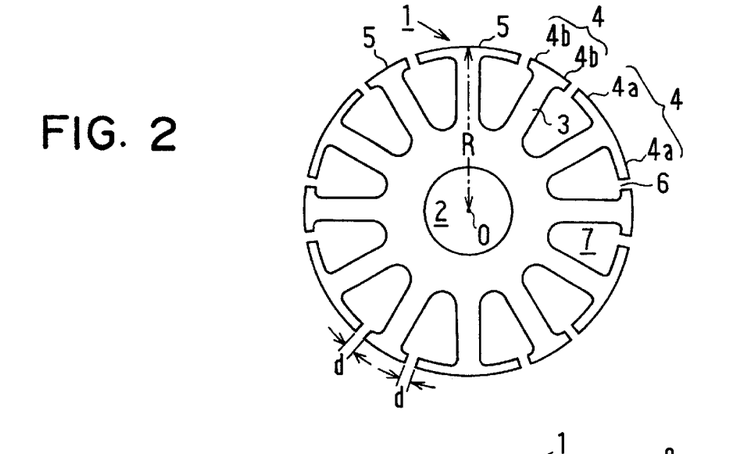
FIG. 2 is a front view of a core used in the armature shown in FIG. 1.

As shown in FIG. 2, the core 1 is formed a through hole 2 at its radial center for fixedly receiving the rotary shaft SH therethrough, and has a plurality of T-shaped teeth 3 extending outwardly from the radial central part in the radial direction. The teeth 3 are arranged at a uniform angular interval in the circumferential direction. Each tooth 3 has an extended protrusion 4 extending in the circumferential direction at its radially outermost end. Each extended protrusion 4 comprises a pair of long protrusion pieces 4a or a pair of short protrusion pieces 4b. The tooth 3 having the long protrusion pieces 4a and the tooth 3 having the short protrusion pieces 4b are arranged alternately in the circumferential direction. Each outer peripheral surface 5 of the long protrusion pieces 4a and the short protrusion pieces 4b is on a circumference of a circle having a radius R around the radial center O of the core 1. The circumferential lengths of the long protrusion piece 4a and the short protrusion piece 4b are determined to provide a slit 6 having a width d between the adjacent protrusion pieces 4a, 4b. The adjacent teeth 3 provide a slot 7 therebetween for accommodating the winding C.

Figure 3:
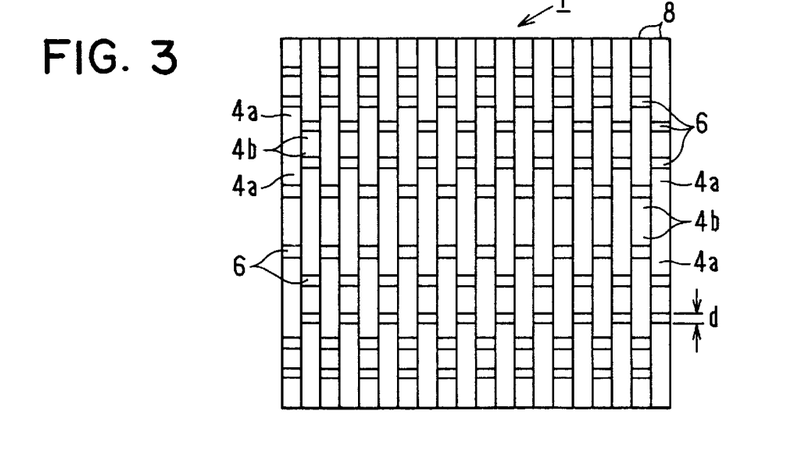
FIG. 3 is a side view of the core shown in FIG. 1.

As shown in FIG. 3, the core 1 comprises a plurality of thin magnetic core sheets 8 stacked in the axial direction. Each core sheet 8 is displaced from the adjacent core sheets 8 by one slot in the circumferential direction. Thus, slits 6 having the uniform slit width d are arranged in crossed manner, i.e., in the discontinuous manner in the axial direction, on the outer peripheral surface of the core 1, so that each slot 6 does not align on a single line in the axial direction.

Figure 4:
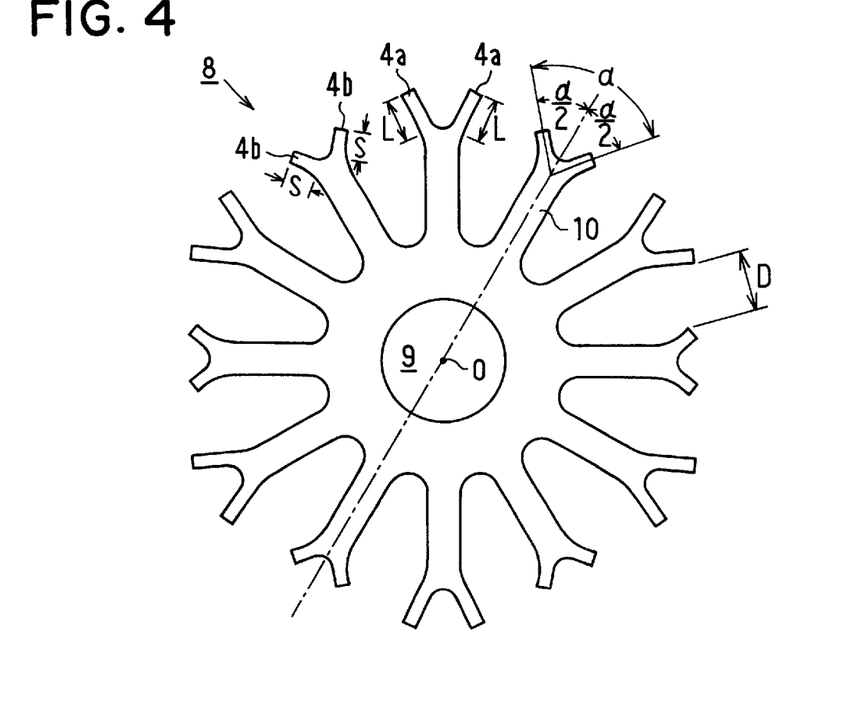
FIG. 4 is a front view of a core sheet used for the core shown in FIGS. 2, 3.

Each core sheet 8 is shaped as shown in FIG. 4. It has a central hole 9, which forms the through hole 2 for the rotary shaft SH, and a plurality of teeth 10, which extends radially outwardly to form the tooth 3. The adjacent teeth 10 have a space for the slot 7 therebetween. The space is open at its radially outermost part.

The tooth 10 has either a pair of long protrusion pieces 4a having the uniform length L or a pair of short protrusion pieces 4b having the uniform length S shorter than the length L. Both protrusion pieces 4a, 4b have the same thickness as the tooth 10. Each pair of protrusion pieces 4a, 4b extending from the outermost end of each tooth 10 are inclined from the central line of the tooth 3 (one-dot chain line) by a uniform angle α/2 to extend in opposite directions. The distance D between the free ends of the long protrusion piece 4a and the short protrusion piece 4b is set to be substantially the same as the maximum width of the slot 7.

Figure 5:
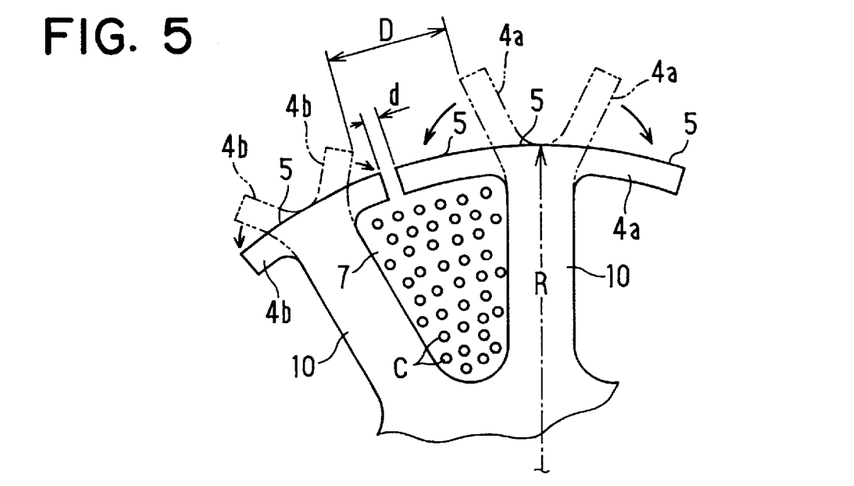
FIG. 5 is an enlarged view of a tooth of the core sheet shown in FIG. 4.

As shown in FIG. 5, the long protrusion pieces 4a and the short protrusion pieces 4a, the original positions of which are shown by two-dot chain line, are bent in the radially inward direction (arrow direction) to the position shown by the solid line. Thus, the outer peripheral surfaces 5 of the protrusion pieces 4a, 4b form an arcuate surface having the radius R from the radial center O, so that the free end of the long protrusion piece 4a and the adjacent free end of the short protrusion piece 4b are spaced apart only by the width d in the circumferential direction.

In assembling the armature A, particularly winding the armature winding C on the core 1, the core sheets 8 are stacked to form the core 1. In this instance, each sheet is displaced from the adjacent sheet by one slot so that the longer protrusion pieces 4a and short protrusion pieces 4b are located alternately in the axial direction as shown in FIG. 3. The core sheets 8 are stacked to provide the core 1 in such a manner that the front surface and the rear surface of each core sheet 8 contact with the rear surface and the front surface of the two adjacent core sheets 8, respectively. The core 1 is fixed on the rotary shaft SH together with the commutator SG. The armature winding C is inserted into the slot 7. Under this condition, the long protrusion pieces 4a and short protrusion pieces 4b are at the original position (not bent), and the slot 7 is wide open at its outermost part. Thus, the armature winding c is inserted into the slot 7 without difficulty. That is, the armature winding C can be wound around the tooth 3 densely in the slot 7, so that the space factor (occupancy ratio of the armature winding C in the slot 7) is increased. Then, the protrusion pieces 4a, 4b are bent inwardly to close the wide open part of the slot 7, leaving only the slit 6 having the width d as shown in FIG. 5.

The first embodiment provides the following advantages. (1) As the armature winding C is inserted through the wide opening having the width D between the protrusion pieces 4a, 4b before bending, it can be wound from the radially inner part (root) of the tooth 3 toward the radially outer part of the same densely in the slot 7. Thus, space factor of the armature winding C in the slot 7 can be increased. (2) As the slit 7 is formed only after inserting the armature winding C in the slots 7, the width d of the slit 6 does not affect the winding inserting operation. Thus, the slit width d can be set as narrow as possible thereby to reduce cogging in the torque of the motor. (3) As each core sheet 8 is displaced in the circumferential direction by one slot from the adjacent core sheet 8 when stacked, the slits 6 are arranged in crossing manner thereby to equalize the magnetic flux distribution. As a result, the reluctance changes do not occur at the same time among core sheets 8 during the rotation of the armature A, thereby reducing further the cogging in the torque of the motor. (4) As the slit width d can be reduced as above, it is enabled to restrict the armature winding C from slipping out of the slot 7 by the protrusion pieces 4a, 4b. Further, as the slits 6 are arranged at different circumferential positions between the adjacent core sheets 8, the armature winding C contacts the radial inner surfaces of the protrusion pieces 4a, 4b at a plurality axial positions. Thus, the armature winding C can be restricted from slipping out of the slots 7 without fail. (5) As each pair of the protrusion pieces 4a, 4b of the tooth 10 extends symmetrically with respect to the central line of the tooth 10, it can be bent with ease with a result that bending operation can be attained efficiently.

(Second Embodiment)

Figure 6:
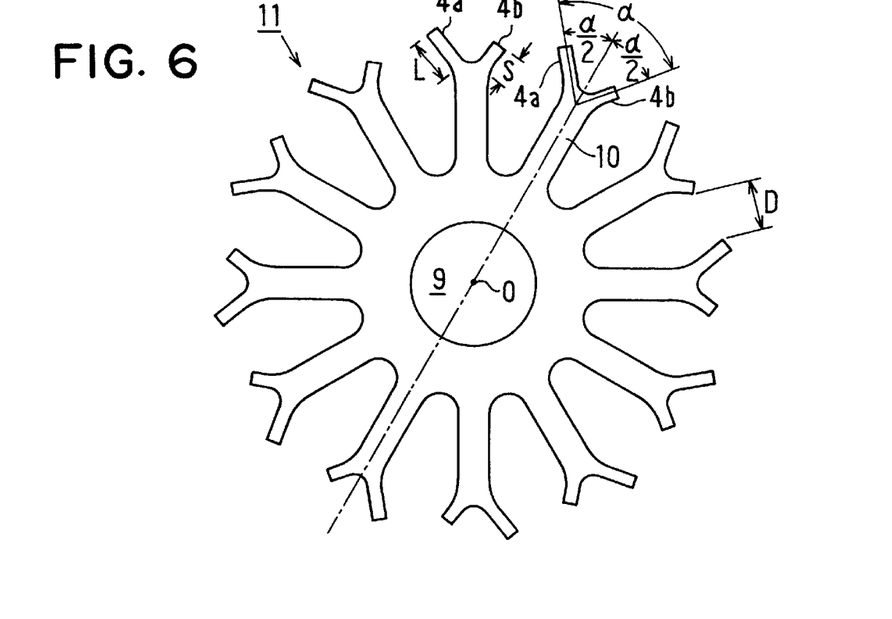
FIG. 6 is a front view of a core sheet according to a second embodiment of the present invention.
Figure 7:
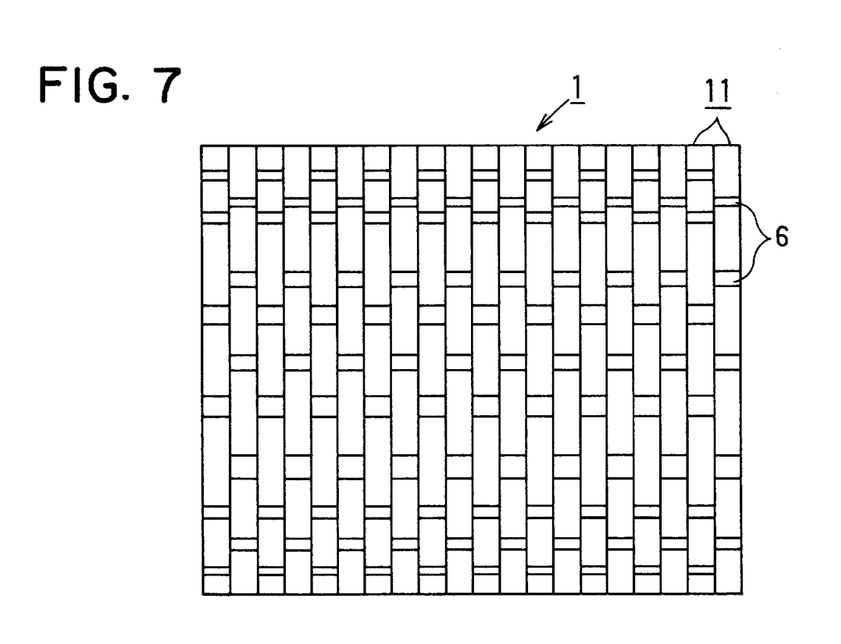
FIG. 7 is a side view of a core using the core sheet shown in FIG. 6.

In this embodiment, as shown in FIG. 6, each core sheet 11 is shaped to have the teeth 10 in the same configuration. That is, each tooth 10 has a pair of long protrusion piece 4a and short protrusion piece 4b in such a manner that the long protrusion piece 4a and the short protrusion piece 4b are arranged alternately in the circumferential direction. The core sheets 11 are stacked to provide the core 1 in such a manner that the front surface and the rear surface of each core sheet 11 contact with the front surface and the rear surface of the adjacent core sheet 11, respectively. That is, the long protrusion piece 4a and the short protrusion piece 4b of each core sheet 11 are in contact with the short protrusion piece 4b and the long protrusion piece 4b, respectively, in the axial direction of the core 1. Thus, the core 1 has the slits 6 between the long protrusion piece 4a and the short protrusion piece 4b as shown in FIG. 7. The slits 6 are not arranged on the same line in the axial direction but are arranged discontinuously, i.e., in crossing manner, in the axial direction. This second embodiment also provides the same advantages (1) to (5) as provided in the first embodiment.

(Third Embodiment)

Figure 8:
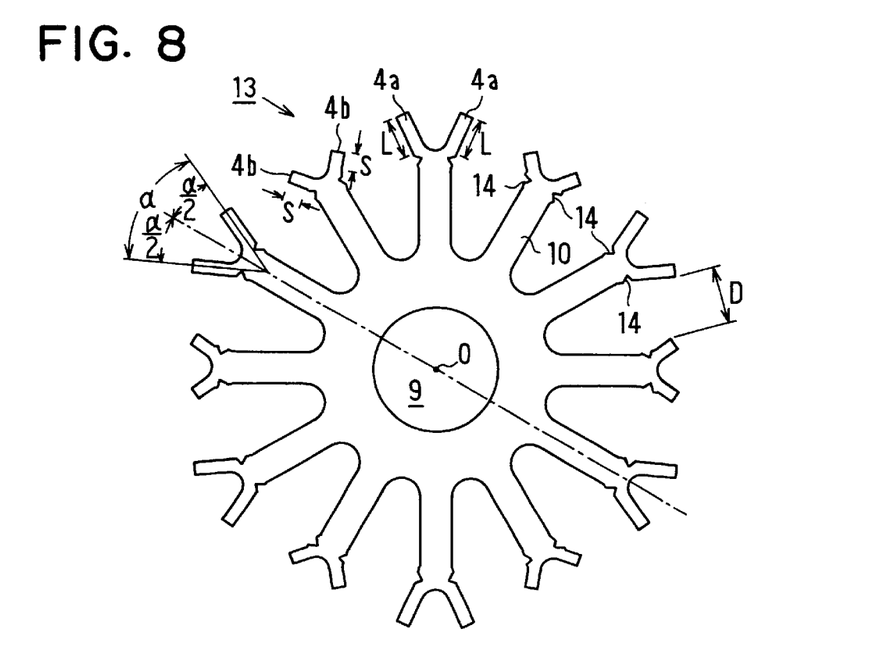
FIG. 8 is a front view of a core sheet according to a third embodiment of the present invention.
Figure 9:
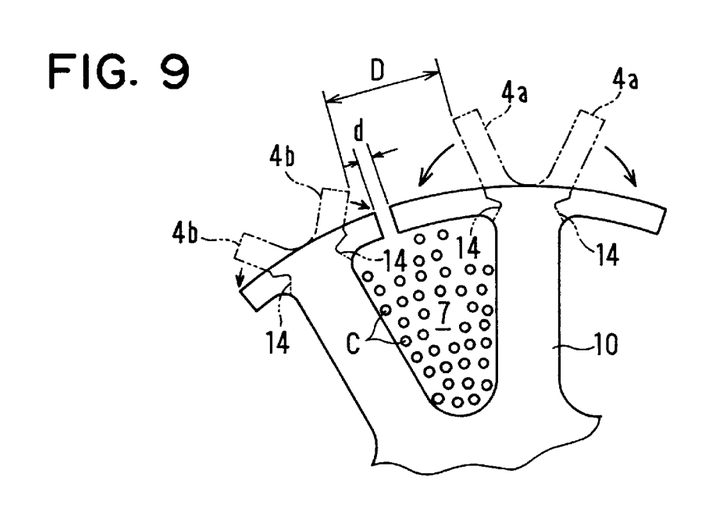
FIG. 9 is an enlarged view of a tooth of the core sheet shown in FIG. 8.

In this embodiment, as shown in FIG. 8, each core sheet 13 has either a pair of long protrusion pieces 4a or a pair of short protrusion pieces 4b on each tooth 10 as in the first embodiment. However, the tooth 10 is formed a pair of cuts 14 at the root part of the protrusion pieces 4a, 4b. That is, the width of the tooth 10 at the root part of the protrusion pieces 4a, 4b is narrowed by the cuts 14 as shown in FIG. 9. This third embodiment also provides the same advantages (1) to (5) as in the first and second embodiments. In addition, the cuts 14 enables easy bending of the protrusion pieces 4a, 4b in the direction to close the slots 7, thereby improving the efficiency of protrusion piece bending work.

(Fourth Embodiment)

Figure 10:
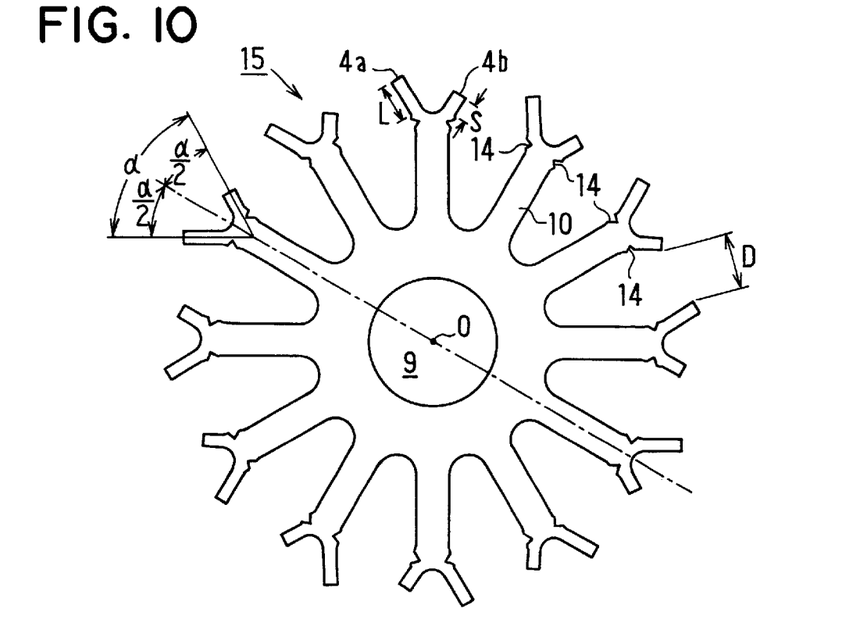
FIG. 10 is a front view of a core sheet according to a fourth embodiment of the present invention.

In this embodiment, as shown in FIG. 10, each core sheet 15 has a pair of long protrusion piece 4a and short protrusion piece 4b on each tooth 10 as in the second embodiment (FIG. 6). Further, cuts 14 are formed on each tooth 10 at the root part of the protrusion pieces 4a, 4b as in the third embodiment (FIG. 8). This fourth embodiment provides the same advantages (1) to (5) as in the second embodiment and the same additional advantage of the third embodiment.

(Fifth Embodiment)

Figure 11:
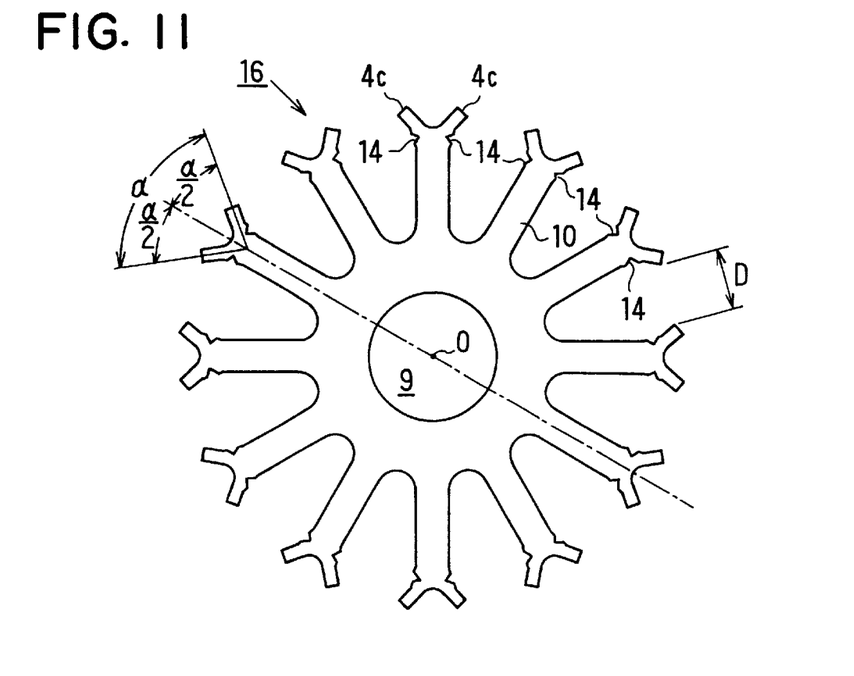
FIG. 11 is a front view of a core sheet according to a fifth embodiment of the present invention.

In this embodiment, as shown in FIG. 11, each core sheet 16 has a pair of protrusion pieces 4c of the same length. Further, cuts 14 are formed on each tooth 10 at the root part of the protrusion pieces 4c. This fifth embodiment provides the same additional advantage of the third and fourth embodiments.

(Sixth Embodiment)

Figure 12:
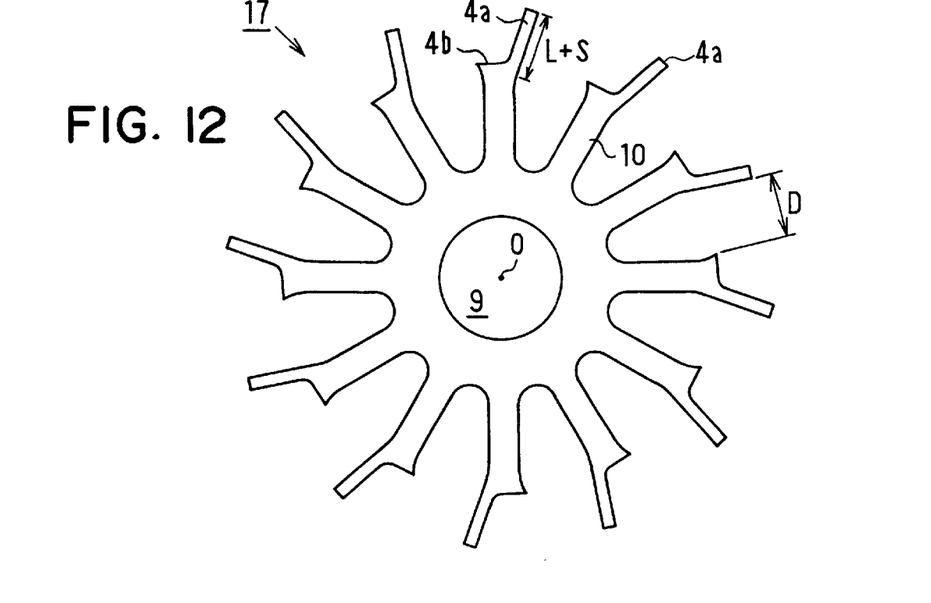
FIG. 12 is a front view of a core sheet according to a sixth embodiment of the present invention.

In this embodiment, as shown in FIG. 12, each core sheet 17 has a single protrusion piece 4a on each tooth 10. The tooth 10 is extended by a length S in the radial direction more than that in the foregoing embodiments. This radial extension of the tooth 10 corresponds to the short protrusion piece 4b in the foregoing embodiments. Thus, the protrusion piece 4a has in effect a length L+S. This sixth embodiment has the same advantages (1) to (4) of the first embodiment. Further, as the tooth 10 has only one protrusion piece 4a, the bending work can be reduced to one half to enhance the bending work efficiency.

(Seventh Embodiment)

Figure 13:
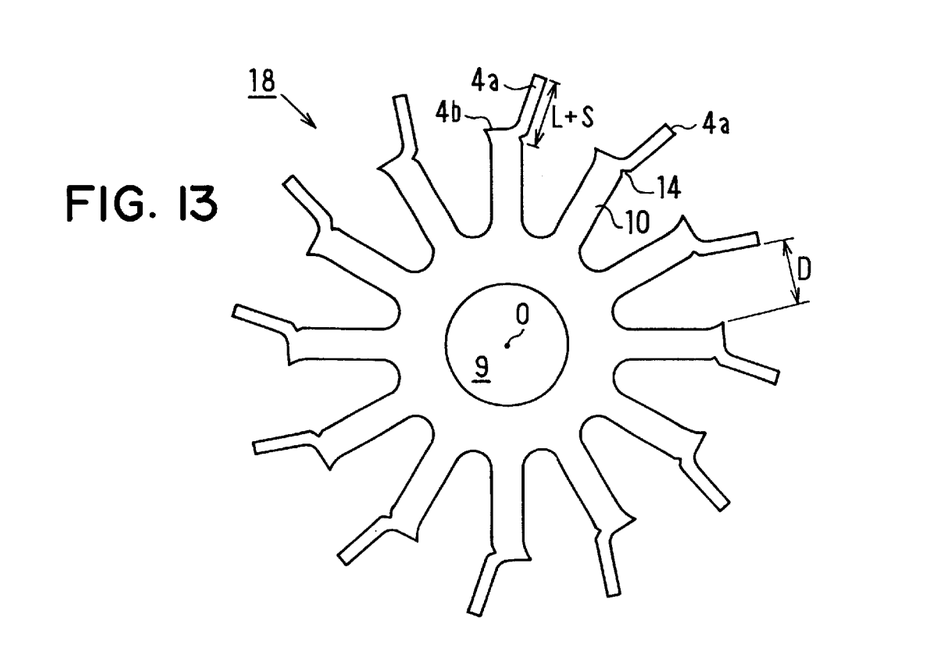
FIG. 13 is a front view of a core sheet according to a seventh embodiment of the present invention.

In this embodiment, as shown in FIG. 13, each core sheet 18 has a single protrusion piece 4a as in the sixth embodiment (FIG. 12). Further, a cut 14 is formed on each tooth 10 at only the root part of the protrusion piece 4a. This seventh embodiment has the same advantages (1) to (4) of the first embodiment. Further, the cut 14 enables the protrusion piece 4a to be bent more easily than in the sixth embodiment.

(Modification)

In the first to fifth embodiments (FIGS. 1 to 11), each tooth 10 may be shaped to have a pair of long protrusion pieces 4a and a pair of short protrusion pieces 4b, which extend in different directions at different angles with respect to the central line of the tooth 10. It is preferred that the short protrusion pieces 4b has a smaller angle relative to the central line of the tooth 10 thereby to provide the distance D between the long protrusion pieces 4a of one tooth and the short protrusion pieces 4a of the adjacent tooth. Thus, the space factor of the armature winding C in the slots 7 can be increased. Further, the winding work efficiency can be enhanced.

Figure 14:
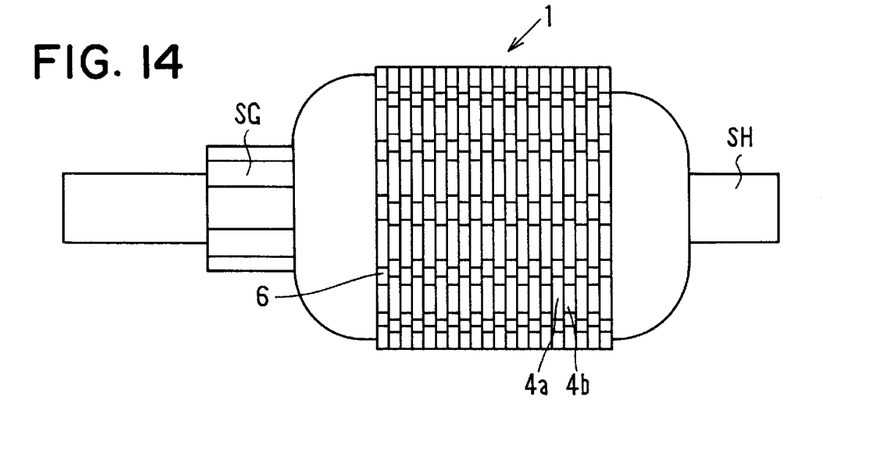
FIG. 14 is a side view of an armature according to a modification of the embodiments of the present invention.
Figure 15:
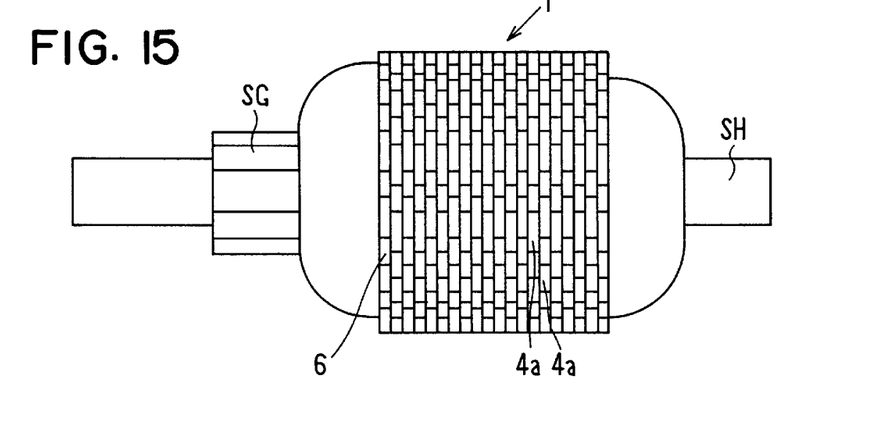
FIG. 15 is a side view of an armature according to another modification of the embodiments of the present invention.
Figure 16:
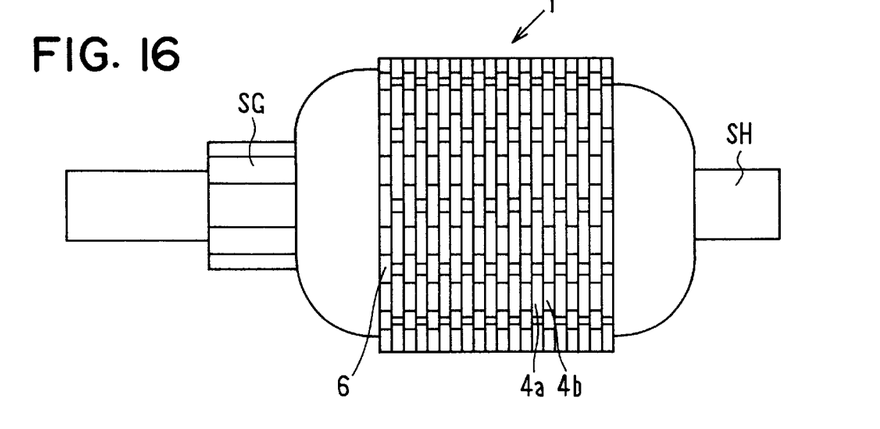
FIG. 16 is a side view of an armature according to a further modification of the embodiments of the present invention.
Figure 17:
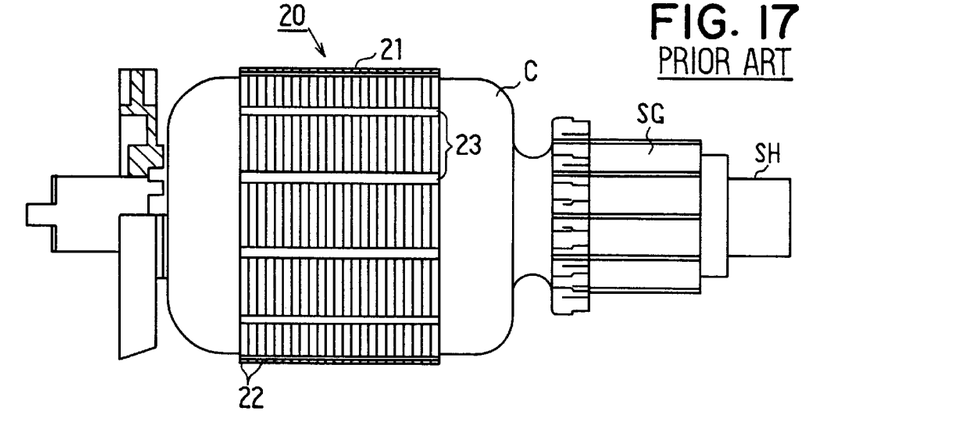
FIG. 17 is a side view of a conventional armature.
Figure 18:
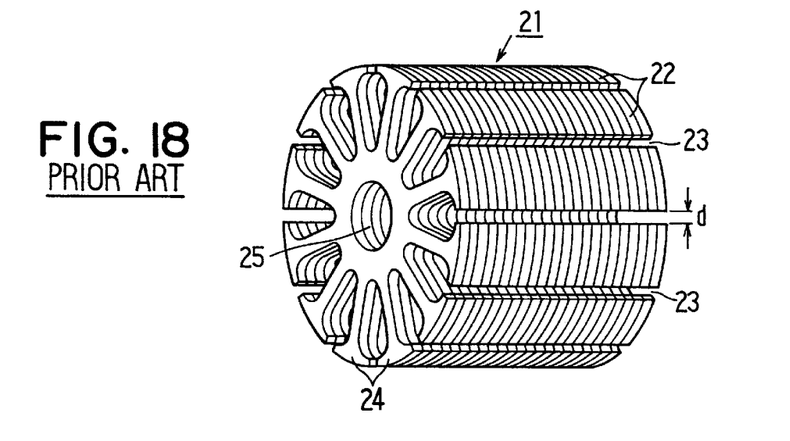
FIG. 18 is a front view of a conventional core used in the armature shown in FIG. 17.

Further, as opposed to most of the foregoing embodiments, in which each slit 6 is displaced in the circumferential direction from the adjacent slits 6 to be fully discontinuous in the axial direction, the core sheets may be stacked so that each slit 6 is arranged to overlap only partially with the adjacent slits 6 to form a narrow straight slit in the axial direction. For instance, as shown in FIG. 14, the core sheet having a pair of long protrusions 4a and a pair of short protrusions 4b alternately in the circumferential direction as in the first embodiment (FIG. 4) may be stacked to provide the slits 6, parts of which extend continuously in the axial direction in a narrower width than the slit width d. Further, as shown in FIG. 15, the core sheet having the same protrusion pieces 4c (FIG. 11) may be stacked to provide the slits 6, parts of which extend continuously in the axial direction in a narrower width than the slit width d. Still further, as shown in FIG. 16, the core sheet having only the long protrusions 4a and the core sheet having only the short protrusion pieces 4b may be stacked alternately to provide the slits 6, parts of which extend continuously in the axial direction in a narrower width than each slit width.

Other modifications and alterations are also possible to those skilled in the art without departing from the spirit of the present invention.

What is claimed is:

1. An armature core on which a winding is wound, having a core comprising:
    a plurality of coresheets, each sheet having teeth arranged around a central part thereof at a uniform angular interval in a circumferential direction and extending from the central part in a radial direction; and
    each sheet having extended protrusion formed on a radially outermost part of each tooth, the extended protrusion being bendable to cover a slot between two of the teeth arranged adjacently in the circumferential direction,
    wherein the extended protrusion on one of the teeth includes a first pair of protrusion pieces which have a first same length and the extended protrusion on another of the teeth adjacent to the one of teeth includes a second pair of protrusion pieces which have a second same length different from the first same length, and
    wherein the sheets are stacked in an axial direction to provide a slit extending continuously over an entire length of the core in the axial direction, a width of a continuous part of the slit being narrower than a width of a slit of each core sheet.

2. An armature core as in claim 1, wherein each of the teeth has cuts at root parts of each of the first and second pairs of protrusion pieces.

3. An armature core on which a winding is wound, the core comprising:
    a plurality of core sheets, each sheet having teeth arranged around a central part thereof at a uniform angular interval in a circumferential direction and extending from the central part in a radial direction; and
    each sheet having an extended protrusion formed on a radially outermost part of each tooth, the extended protrusion being bendable to close a slot between two of the teeth arranged adjacently in the circumferential direction,
    wherein the extended protrusion on each of the teeth includes a first protrusion piece having a first length and a second protrusion piece having a second length different from the first length, the first protrusion piece and the second protrusion piece of an adjacent tooth being arranged to cover the same slot; and wherein the sheets are stacked in an axial direction to provide a slit extending continuously over an entire length of the core in the axial direction, a width of a continuous part of the slit being narrower than a width of a slit of each core sheet.

4. An armature core as in claim 3, wherein each of the teeth has cuts at root parts of each of the first and second protrusion pieces.

5. An armature core on which a winding is wound, having a core comprising:

a plurality of core sheets, each sheet having teeth arranged around a central part thereof at a uniform angular interval in a circumferential direction and extending from the central part in a radial direction; and each sheet having an extended protrusion formed on a radially outermost part of each tooth, the extended protrusion being bendable to close a slot between two of the teeth arranged adjacently in the circumferential direction, wherein the extended protrusion on each of the teeth includes a single protrusion piece, and wherein the sheets are stacked in an axial direction to provide a slit extending continuously over an entire length of the core in the axial direction, a width of a continuous part of the slit being narrower than a width of a slit of each core sheet.

6. An armature core as in claim 5, wherein each of the teeth has a cut at a root part of the single protrusion piece.

7. A core comprising:

a plurality of core sheets stacked in an axial direction, each of the core sheets having a plurality of teeth arranged around a central part thereof at a uniform angular interval in a circumferential direction and extending from the central part in a radial direction, and an extended protrusion formed on a radially outermost part of each tooth, the extended protrusion being bendable to cover a slot between two of the teeth arranged adjacently in the circumferential direction, wherein the extended protrusion of one of the teeth and the extended protrusion on another one of the teeth arranged adjacently in the circumferential direction are formed to provide a slit therebetween which is completely discontinuous with a slit of another one of the core sheets stacked adjacently in the axial direction over an entire length of the stacked core sheets in the axial direction; and wherein the extended protrusion on each of the teeth includes a first protrusion piece having a first length and a second protrusion piece having a second length different from the first length, the first protrusion piece and the second protrusion piece of an adjacent tooth being arranged to cover the same slot.

8. A core as in claim 7, wherein each core sheet is stacked with a front surface thereof being in contact with a front surface of the another one of the core sheets stacked adjacently in the axial direction.

9. A core comprising:

a plurality of core sheets stacked in an axial direction, each of the core sheets having a plurality of teeth arranged around a central part thereof at a uniform angular interval in a circumferential direction and extending from the central part in a radial direction, and an extended protrusion formed on a radially outermost part of each tooth, the extended protrusion being bendable to cover a slot between two of the teeth arranged adjacently in the circumferential direction, wherein the extended protrusion of one of the teeth and the extended protrusion on another one of the teeth arranged adjacently in the circumferential direction are formed to provide a slit therebetween which is completely discontinuous with a slit of another one of the core sheets stacked adjacently in the axial direction over an entire length of the stacked core sheets in the axial direction; and wherein the extended portion on each of the teeth includes a single protrusion piece.

* * * * *